Sept. 24, 1963 M. V. PECK ETAL 3,104,578
BLADE-GUIDE SYSTEM
Filed Feb. 16, 1959 5 Sheets-Sheet 5
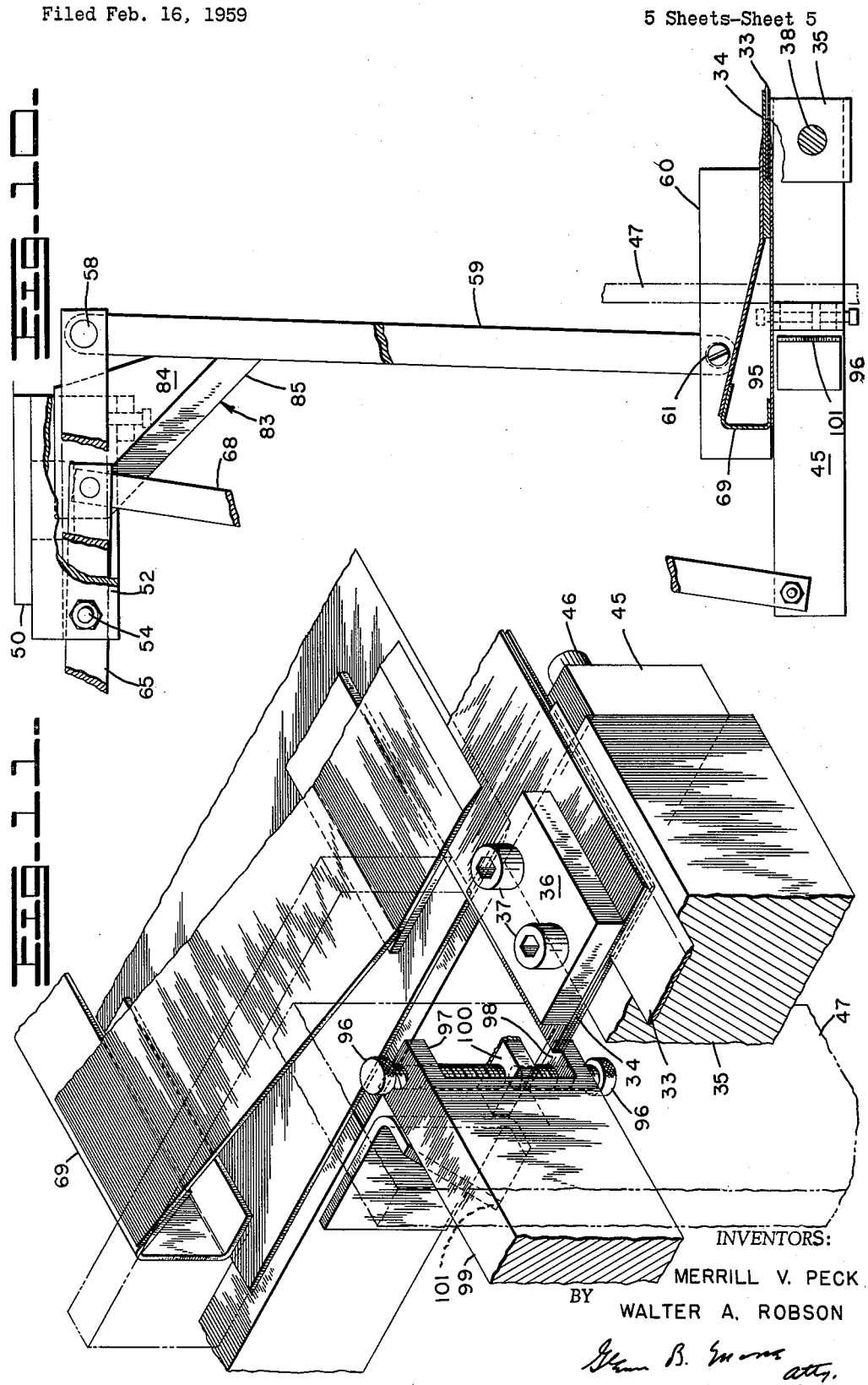
INVENTORS:
MERRILL V. PECK
WALTER A. ROBSON
BY United States Patent Office 3,104,578
Patented Sept. 24, 1963

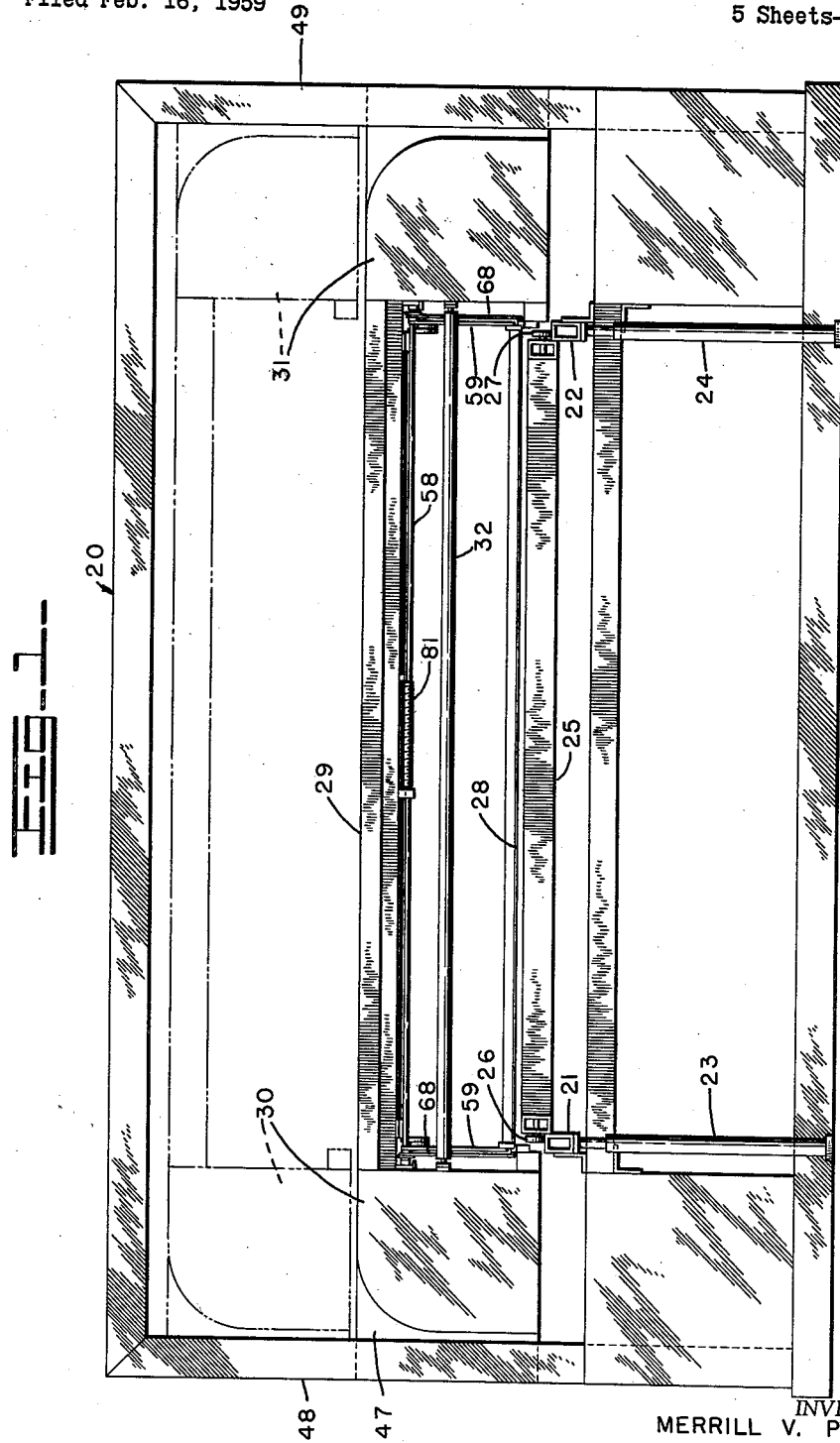

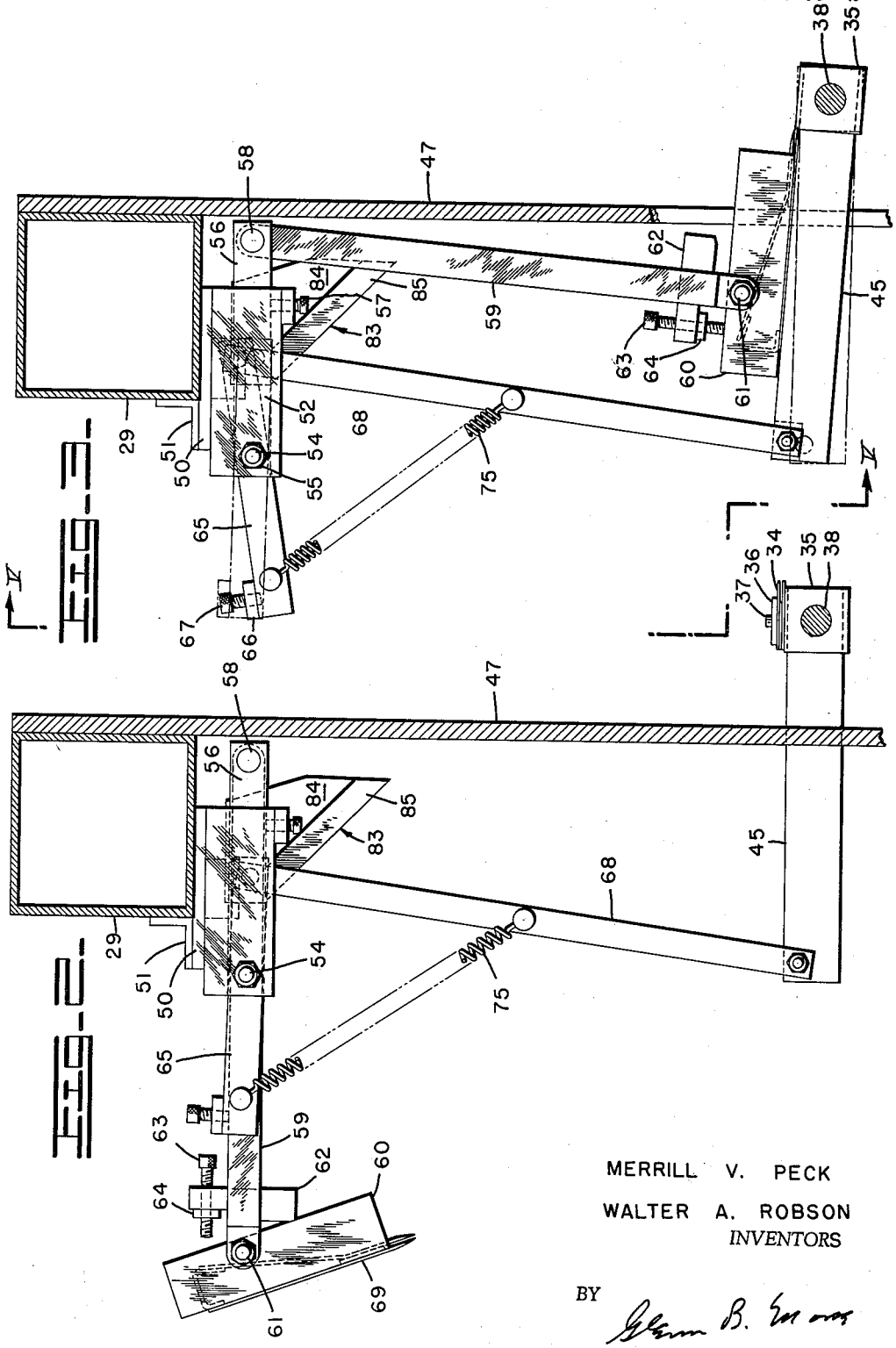

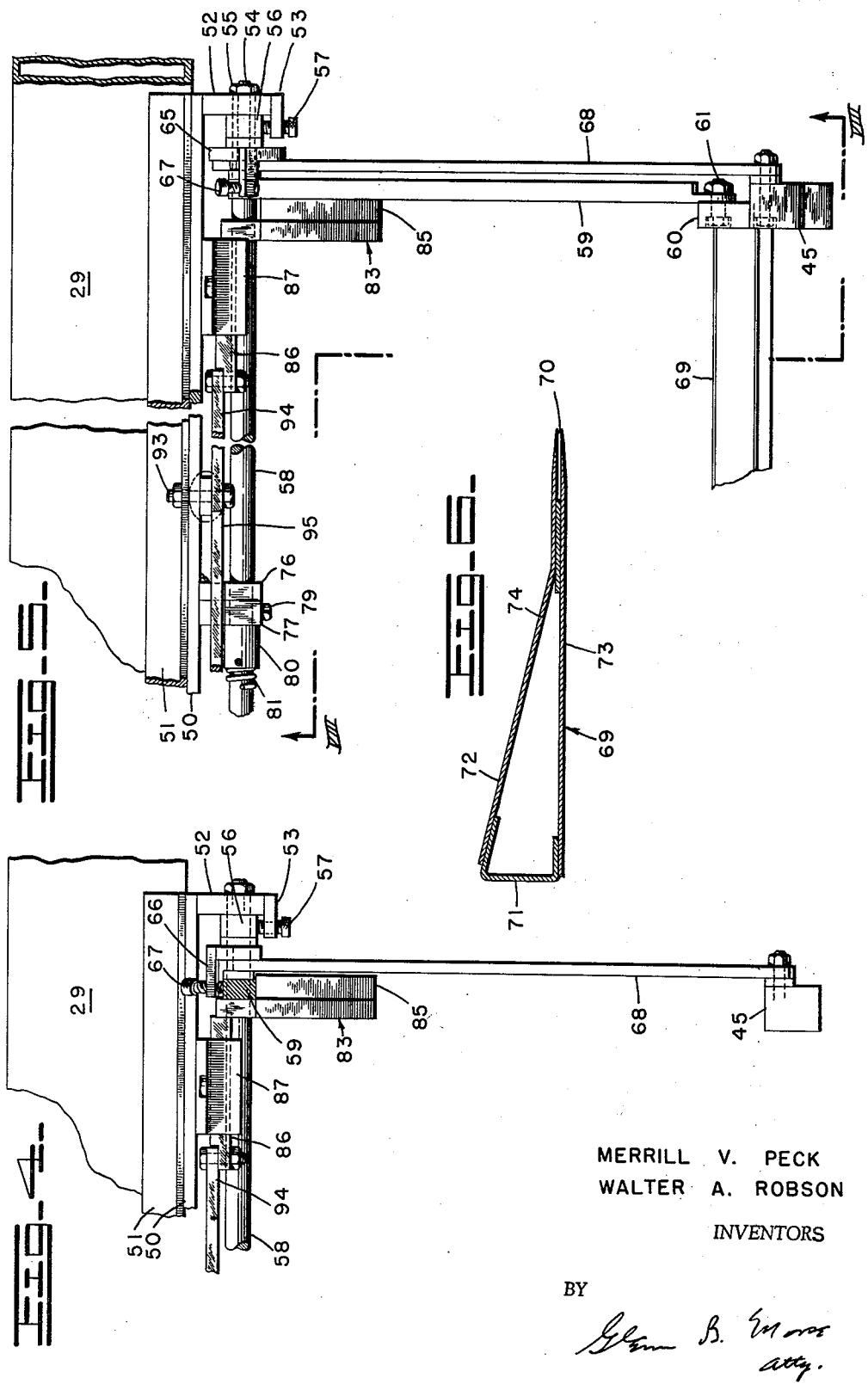

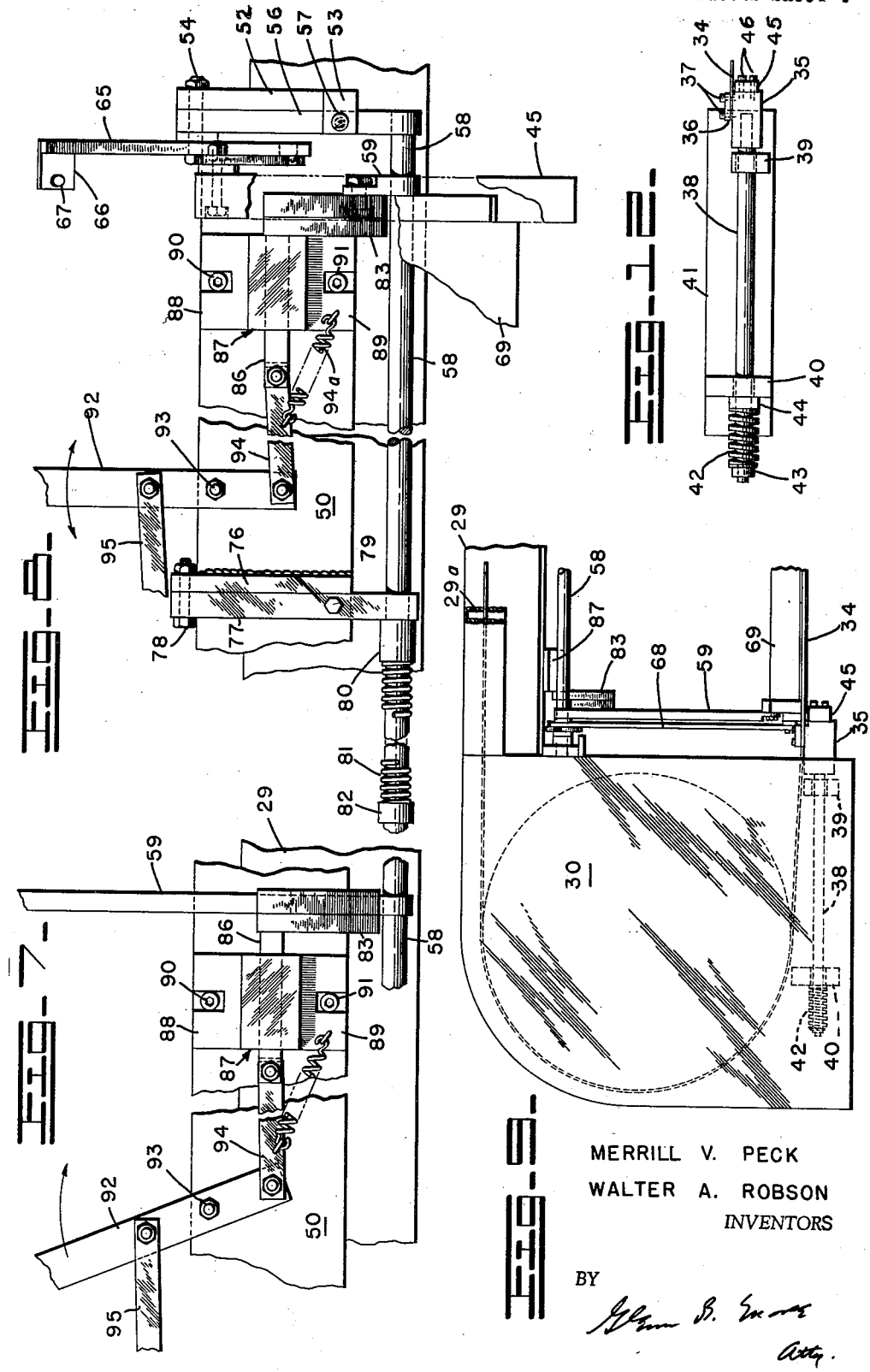

3,104,578
BLADE-GUIDE SYSTEM
Merrill V. Peck, 926 14 Mile Road, Sparta, Mich., and Walter A. Robson, 3849 Lake Michigan Drive NW., Grand Rapids, Mich.
Filed Feb. 16, 1959, Ser. No. 793,364
10 Claims. (Cl. 83—201)

This invention relates to the construction of machines having an elongated band-shaped cutting blade, and particularly to guide structure for maintaining the path of movement of the blade. The invention has been developed in conjunction with a machine using an endless blade carried on horizontally-spaced wheels for slicing to thickness large sheets of compressible materials similar to foamed rubber and synthetics.

Experience in the construction of machines designed for handling this type of material has established that the most effective cutting action involves slicing rather than sawing, and this requires that the material move around the blade as the cutting action proceeds. The resulting compression of the material must be kept to a minimum, and this consideration is the principal factor in determining the design of any guiding device which extends along the blade to support it in the material. It is often desirable to slice along a line of five to seven feet in length. The blade is often surrounded by considerable depth of material, creating a tendency for the blade to drift away from its free path of movement under forces generated by side pressure. The purpose of the fixed guide is to stabilize the path of movement of the blade insofar as is possible.

The amount of the required rigidity and stabilizing effect varies according to the character and density of the material being sliced. When small thicknesses of light spongy material are being removed, the lateral pressure on the blade and guide is less than when the thickness and density of the material is greater. The requirements of the guide system therefore vary according to the particular cutting operation involved, and a versatile machine must be able to accommodate itself to these varying conditions which are continually encountered.

It is well-known that a thin U-shaped guide can be used to embrace the rearward portion of a band blade, leaving the edge exposed for cutting action. Particularly if the guide is subject to considerable tension, this arrangement is sufficient to handle cuts in relatively soft material, but is entirely inadequate as the density of the material increases. It has also been established that the desirable attitude of the blade with respect to the cutting plane should be variable to suit the material characteristics.

These variations and guiding requirements have resulted in the use of detachable guides of varying degrees of rigidity, but the practical difficulties encountered in the use of this arrangement have resulted in very limited use of it. To begin with, a very definite position must be established between the guide and the blade in order to operate satisfactorily. The structures are rather delicate because of the thinness of the material used near the blade in an effort to reduce the total thickness of the obstruction. Attaching and removing the guide, and the readjustment of the attitude of the cutting system, have proven to be sufficiently time-consuming to largely eliminate the practice of adapting one machine to various types of material.

This invention provides a movable mounting for an auxiliary guide beam which is capable of quickly engaging the fixed guide with the necessary closeness of fit. An arrangement is provided for assuring the alignment of the two guides as they are moved into engagement so that the resulting tolerance requirement is vastly reduced. The invention also provides an automatic adjustment of the attitude of the guide system according to whether the auxiliary supporting beam is engaged or not. This engagement of the auxiliary guide beam is a very simple procedure, and requires no dis-assembly of the mechanism. The positioning mechanism for the fixed and auxiliary guides is provided with a number of valuable adjustments which make it very easy to adapt the machine to an endless variety of conditions of operation. The several features of the invention will be analyzed in detail through a discussion of the particular embodiments illustrated in the accompanying drawings. In the drawings:

FIGURE 1 presents a front elevation of a machine embodying the invention.

FIGURE 2 presents a sectional side elevation on an enlarged scale showing the auxiliary guide member in the retracted position.

FIGURE 3 presents a view similar to that of FIGURE 2, but with the auxiliary guide member approaching engaged position. The fixed guide is not present in FIGURE 3.

FIGURE 4 presents a fragmentary rear view of the mechanism in the position shown in FIGURE 2.

FIGURE 5 presents a fragmentary rear view of the mechanism in the position shown in FIGURE 3.

FIGURE 6 presents a cross-sectional view on an enlarged scale showing the auxiliary guide member.

FIGURE 7 presents a fragmentary view showing the locking mechanism for maintaining the selected position of the auxiliary guide member.

FIGURE 8 presents a view similar to that of FIGURE 7, and taken on the plane VIII—VIII of FIGURE 5.

FIGURE 9 presents a fragmentary view at one side of the machine, in front elevation, and showing the auxiliary guide in the engaged position.

FIGURE 10 is a fragmentary view in side elevation showing the auxiliary guide member in the fully engaged position.

FIGURE 11 presents a fragmentary sectional view in perspective on an enlarged scale showing the components of the machine at the ends of the guide members.

FIGURE 12 illustrates the method of mounting the ends of the permanent guide member.

Referring to FIGURE 1, a machine is illustrated which is designed primarily for cutting to thickness large slabs of foamed rubber or plastic material. The machine includes a fixed frame 20 normally secured to the floor, and which includes the parallel rails 21 and 22 supported by the posts 23 and 24, respectively. A moving table 25 is provided with rollers as indicated at 26 and 27 which engages the rails 21 and 22 to permit the table to move freely under the cutting area of the machine. This movement will result in passing the blade 28 through the material carried by the table, with the thickness of the slab being determined by the vertical distance from the top of the table 25 to the blade 28.

This distance is variable as a result of the mounting of the cutting mechanism on a transverse beam 29 which is vertically movable within the frame 20. This frame may be raised to the position shown in dotted lines by a simple adjustment of the controls. Wheels similar to those used in the construction of band saws are mounted within the housings 30 and 31, with one section of the canvas blade moving along the position indicated at 28, with the return section moving within the housing 29a. A roller 32 is preferably incorporated in the machine, and is mounted on the structure associated with the beam 29. The purpose of the roller is to maintain the material carried by the table 25 in a definite position adjacent the cutting area to obtain the best uniformity in the cutting operation.

The endless cutting blade 33 carried by the wheels in the housings 30 and 31 (as shown in FIGURE 9) is of such great length with respect to its breadth and thickness that provision must be made for stabilizing the path of movement of the blade as it moves through the bulk material carried by the table 25. A U-shaped guide member 34 embraces the blade leaving only the cutting edge exposed, and the natural stiffness of the guide 34 is supplemented by the application of tension between its opposite ends established by the assembly best shown in FIGURE 12. The end of the permanent guide 34 is secured to the terminal block 35 with screws as shown at 36 and 37. This block is fixed with respect to a shaft 38 carried in the bearings 39 and 40 mounted on the base plate 41 which may be considered as normally fixed with respect to the housing 30. The shaft 38 is axially slidable with respect to the bearings 39 and 40, and a compression spring 42 acting between an abutment 43 on the shaft 38 and a thrust bearing assembly 44 serves to bias the shaft to the left as shown in FIGURE 12, and thereby apply a tension to the permanent guide 34. Similar structure is located on the opposite side of the machine except for the spring 42. The angular position of the shaft 38 and the terminal block 35 about the axis of the bearings 39 and 40 is determined by the lever 45 which is positioned by the mechanism best shown in FIGURES 2, 3, and 10.

The lever 45 is secured to the terminal block 35 by screws as indicated at 46. A plate 47 is fixed with respect to each end of the beam 29, and acts as a base plate for supporting the wheels within the housings 30 and 31, and also for supporting the plate 41 of the guide-positioning mechanism shown in FIGURE 12. Portions of the plates 47 are slidably received within guideways on the vertical portions 48 and 49 of the frame 20 in a conventional arrangement forming no part of this invention.

A plate 50 is secured to the beam 29 with the assistance of the angle 51, which is itself secured to the beam 29 by any convenient arrangement such as fastenings or welding. An end block 52 is secured to the plate 50; and together with the shelf plate 53, forms a bracket supporting the bolt 54 and the structure carried upon it. The nut 55 holds the bolt 54 in solid engagement with the end-block 52. A lever 56 is pivotally mounted on the bolt 54, immediately adjacent the plate 52. The screw 57 has threaded engagement with the shelf plate 53, and adjustment of the screw induces an angular variation of the lever 56 about the axis of the bolt 54. The shaft 58 is positioned by the outer end of the lever 56, and the principal purpose of the adjustment of the screw 57 is to vary the position of the shaft 58 with respect to the frame of the machine.

A radius arm 59 extends from the shaft 58, and is fixed with respect thereto. Substantially all of this structure is duplicated at the opposite ends of the machine, and a primary purpose of the shaft 58 is to assure that the arms 59 move together. The blocks 60 are pivotally mounted on the outer ends of the radius arms 59 on the bolts 61, with the freedom of pivotal movement being limited by the presence of the stop block 62. This block is fixed with respect to the arms 59, and is disposed to limit counterclockwise rotation of the block 60 with respect to the arm 59 as shown in FIGURE 2. Rotation in the clockwise direction is limited by the presence of the screw 63 in threaded engagement with the block 62, with the adjusted position of the screw 63 being maintained by the lock nut 64.

A lever 65 is pivotally mounted on the bolt 54 at an intermediate point on the lever, and the rearward end of the lever is provided with a laterally-projecting plate 66 supporting the screw 67, with which it is in threaded engagement. This screw serves as an adjustable abutment in the path of movement of the radius arm 59, and upward swinging movement of this arm will eventually result in contacting the lower end of the screw 67. This action will induce clockwise rotation of the lever 65 about the bolt 54. The forward end of the lever 65 provides a pivotal connection with the link 68, which is also pivotally connected to the lever 45, and serves to position the terminal block carrying the permanent blade guide about the axis of the shaft 38. As a result of this linkage, raising the arms 59 to the extreme position shown in FIGURE 2 will cause the lever 45 to move from the full line to the dotted line position shown in FIGURE 3.

The end block 60 carried by the radius arm 59 provides support for the auxiliary guide beam 69, the cross-section of which is best shown in FIGURE 6. This member is of hollow construction and extends between the blocks 60 at the opposite sides of the machine, and has a thin U-shaped opening 70 of exactly the right size to embrace the rear portion of the permanent guide member 34 when the beam is in the position illustrated in FIGURE 10. The formation of the auxiliary beam 69 is based upon a relatively heavy piece of formed sheet metal indicated at 71 to which the top and bottom plates 72 and 73 are secured. A spacer 74 is interposed between the plates 72 and 73 at the forward portion of the beam to provide just the right clearance for the engagement of the fixed guide member 34.

The closeness of the fit between the opening 70 and the permanent guide member 34 is such that special provision must be made to establish the angular position of the auxiliary beam 69 about the axis of the bolts 61. This automatic alignment is acomplished by disposing the end blocks 60 in position to engage the upper surface of the levers 45 as the auxiliary beam is swung into the position shown in FIGURE 10. The angular position of the lever 45 is resilient, and the effect of the spring 75 is to establish a yieldable biasing action urging the lever 45 upwardly against the plate 60 to remove any tendency to jam the machine, while yet assuring a positive positioning of the components so that the auxiliary beam may be properly engaged. It should be noted that since the lever 45 is also responsible for positioning the permanent guide 34 about the axis of the shaft 35, it automatically has the effect of causing a proper alignment between the jaw 70 and the permanent guide 34. The effect of the lever 45 is to bring the angular positions of the guide member 34 and the auxiliary beam 69 to a common reference.

In the central area of the machine, it is preferable to include one or more brackets 76 secured to the plate 50, and these brackets have a function identical to that of the end plates 52. A lever 77 is pivotally connected to the bracket 76 on the bolt 78, and a screw determines the angular position of the lever 77 about the axis of the bolt 78. The adjustment of the screws 79 is made to conform with that of the screws 57 so that the axis of the shaft may be on a straight line. A collar 80 is fixed with respect to the lever 77, and forms a terminal for one end of the torsion spring 81. The opposite end of the spring 81 is rotatively fixed with respect to the collar 82. The latter collar is fixed with respect to the shaft 58, with the net result that the angular displacement of the collar 82 with respect to the collar 80 will apply a given degree of torsion to the springs which may be conformed to the moment of the auxiliary beam 69, and its associated structure, about the axis of the shaft 58. This arrangement will result in minimizing the amount of force required to swing the auxiliary beam from the position shown in FIGURE 10 to that of FIGURE 2.

The radius arms 59 can be locked in a selected position (either that of FIGURE 2 or that of FIGURE 10) by the action of the movable stop 83. This member is constructed of a plate 84 to which a bar 85 is secured, and the plate 84 is fixed with respect to a square actuating rod 86 slidably received in the bearing block 87. This block has opposite flanges 88 and 89 secured to the plate 50 by the screws 90 and 91. The square cross-section of the rod 86, and the similarly formed bearing passage in the block 87, result in fixing the plate 84 and the bar 85 against rotation. When the rod 86 and the stop 83 are in the position shown in FIGURE 8, the radius arm 59 is free to swing. The rod 86 may be moved to the right either when the arm is in the fully engaged position embracing the fixed guide 34, or in the fully retracted position shown in FIGURE 2. In either case, one or the other of the ends of the bar 85 serve to block the swinging movement of the radius arm 59 when the stop member 83 is in the position shown in FIGURE 7. An operating lever 92 is pivotally mounted on the plate 50 at the bolt 93, and is connected to the rod 86 by the link 94. The spring 94a urges the assembly to the FIGURE 7 position. Another link 95 connects the lever 92 with the corresponding structure at the opposite end of the machine, and positioning of the lever 92 controls the position of the stops for maintaining the engagement or retraction of the auxiliary beam 69 at both ends.

The significance of the adjustment of the screws 57 referred to previously can now be more easily appreciated. Vertical movement of the shaft 58 will cause corresponding vertical movement (in the FIGURE 10 position) of the axis of the bolts 61 at the outer ends of the radius arms 59. Since the vertical position of the shaft 58 is fixed, the net result of this adjustment is to vary the angular position of the auxiliary guide member 69 as it comes into engagement with the fixed guide member 34. The resilient tendency of the lever 45, and its associated linkage, to follow the end blocks 60 will result in alignment of the permanent guide member 34 to whatever angle is established by the adjustment of the screws 57. A limitation on the movement of the lever 45 is provided by the double adjustments represented by the screws 96, which are received in threaded engagement with the flanges 97 and 98, respectively, of the block 99 secured to the plate 47. A lug 100 is welded to the side of the lever 45, and oscillates between the abutments provided by the ends of the screws 96. If desired, an indicating pointer 101 can be mounted on the lever 45 to cooperate with suitable indicia on the block 99 to guide the mechanic in setting the position of the screws 96.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; biasing means inducing axial separation of said terminal blocks; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks, the axis of rotation of said second lever means being disposed at an intermediate point thereon; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; interengageable abutment means on said second lever means and radius arm means whereby continued upward swinging movement of said radius arm means causes engagement of said abutment means and downward movement of said first lever means; means on said second lever means providing a surface for engaging the ends of said second guide member as it swings downward to position said guide member about the axis of pivotal mounting thereof on said radius arm means; stop means for maintaining the selected position of said radius arm means about the axis of pivotal mounting thereof; means for adjusting the relative position of the axis of pivotal mounting of said radius arm means and first lever means; biasing means urging said first lever means normally upward; and stop means limiting the freedom of rotation of said first lever means with respect to said frame.

2. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; biasing means inducing axial separation of said terminal blocks; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks, the axis of rotation of said second lever means being disposed at an intermediate point thereon; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; adjustable interengageable abutment means on said second lever means and radius arm means whereby continued upward swinging movement of said radius arm means causes engagement of said abutment means and downward movement of said first lever means; means on said second lever means providing a surface for engaging the ends of said second guide member as it swings downward to position said guide member about the axis of pivotal mounting thereof on said radius arm means; shaft means connecting said radius arm means for causing the same to rotate together; stop means for maintaining the selected position of said radius arm means about the axis of pivotal mounting thereof; and means for adjusting the relative position of the axis of pivotal mounting of said radius arm means and first lever means.

3. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; biasing means inducing axial separation of said terminal blocks; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; interengageable abutment means on said second lever means and radius arm means whereby continued upward swinging movement of said radius arm means causes engagement of said abutment means and downward movement of said first lever means; means on said second lever means providing a surface for engaging the ends of said second guide member as it swings downward to position said guide member about the axis of pivotal mounting thereof on said radius arm means; shaft means connecting said radius arm means for causing the same to rotate together; stop means for maintaining the selected position of said radius arm means about the axis of pivotal mounting thereof; and means for adjusting the relative position of the axis of pivotal mounting of said radius arm means and first lever means.

4. In combination with a cutting machine including a frame and an elongated band-shaped cutting member having a substantially fixed path of movement, a guide system for said cutting member comprising: a first guide member, said first guide member embracing said cutting member along a susbtantial portion of the length of the path thereof; terminal blocks secured to the opposite ends of said first guide member; pivotal mounting means on said frame for said terminal blocks providing freedom to rotate on an axis parallel to and adjacent said path portion; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; interengageable abutment means on said second lever means and radius arm means whereby continued upward swinging movement of said radius arm means causes engagement of said abutment means and downward movement of said first lever means; means on said second lever means providing a surface for engaging the ends of said second guide member as it swings downward to position said guide member about the axis of pivotal mounting thereof on said radius arm means; and means for adjusting the relative position of the axis of pivotal mounting of said radius arm means and first lever means.

5. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; biasing means inducing axial separation of said terminal blocks; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; interengageable abutment means on said second lever means and radius arm means whereby continued upward swinging movement of said radius arm means causes engagement of said abutment means and downward movement of said first lever means; means on said second lever means providing a surface for engaging the ends of said second guide member as it swings downward to position said guide member about the axis of pivotal mounting thereof on said radius arm means; shaft means connecting said radius arm means for causing the same to rotate together; and stop means for maintaining the selected position of said radius arm means about the axis of pivotal mounting thereof.

6. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; first lever means, said first lever means extending laterally in the same direction from each of said terminal blocks; second lever means, said second lever means being pivotally mounted on said frame means normally above said first lever means on an axis of rotation parallel to the axis of rotation of said terminal blocks; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being pivotally mounted at the opposite ends thereof on said radius arm means in a position for engagement with said first guide member; interengageable abutment means on said second lever means and radius arm means whereby continued upward swinging movement of said radius arm means causes engagement of said abutment means and downward movement of said first lever means; and means on said second lever means providing a surface for engaging the ends of said second guide member as it swings downward to position said guide member about the axis of pivotal mounting thereof on said radius arm means.

7. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; terminal blocks secured to the opposite ends of said first guide member; pivotal mounting means on said frame for said terminal blocks providing freedom to rotate on an axis parallel to and adjacent said path portion; first lever means, said first lever means extending laterally in the same direction from each of said terminal blocks; second lever means, said second lever means being pivotally mounted on said frame means on an axis of rotation parallel to the axis of rotation of said terminal blocks; link means connecting said first and second lever means for opposite rotation thereof; opposite radius arm means disposed adjacent said second lever means and pivotally mounted on said frame for rotation on an axis substantially parallel to the axis of rotation of said terminal blocks; a second guide member, said second guide member having means for disengageably embracing said first guide member, and being mounted at the opposite ends thereof on said radius arm means in a position for engagement with said first guide member; and interengageable abutment means on said second lever means and radius arm means whereby continued upward swinging movement of said radius arm means causes engagement of said abutment means and movement of said first lever means.

8. In combination with a cutting machine including a frame and an elongated band-shaped cutting member having a substantially fixed path of movement, a guide system for said cutting member comprising: a first guide member, said first guide member embracing said cutting member along a substantial portion of the length of the path thereof; pivot means on said frame, said first guide member being mounted on said pivot means for limited rotation with respect to said frame; opposite radius arm means disposed opposite the ends of said first guide member and pivotally mounted on said frame normally above said first guide member for rotation on an axis substantially parallel to said first guide member; and a second guide member, said second guide member having means for disengageably embracing said first guide member, and being mounted at the opposite ends thereof on said radius arm means in a position for engagement with said first guide member.

9. In combination with a cutting machine including a frame and an elongated band-shaped cutting member having a substantially fixed path of movement, a guide system for said cutting member comprising: a first guide member, said first guide member being pivotally mounted on said frame and having a U-shaped cross-section and embracing said cutting member along a substantial portion of the length of the path thereof; a second guide member, said second guide member having a U-shaped portion engageable with the back of said first guide member, and being mounted on said frame for pivotal movement to and from a position engaging said first guide member; and means responsive to the position of said second guide member for varying the angular position of said first guide member with respect to said frame about the axis of said first guide member.

10. In combination with a cutting machine including a frame and an elongated band-shaped cutting member having a substantially fixed path of movement, a guide system for said cutting member comprising: a first guide member, said first guide member being pivotally mounted on said frame and embracing said cutting member along a substantial portion of the length of the path thereof; a second guide member, said second guide member having a portion engageable with said first guide member, and being mounted on said frame for movement to and from a position engaging said first guide member; and means responsive to the position of said second guide member for varying the angular position of said first guide member with respect to said frame about the axis of said first guide member.

References Cited in the file of this patent

UNITED STATES PATENTS

| | | |
|---|---|---|
| 1,088,573 | Heldmann | Feb. 24, 1914 |
| 2,696,253 | Hartman | Dec. 7, 1954 |
| 2,821,254 | Kernen | Jan. 28, 1958 |

FOREIGN PATENTS

| | | |
|---|---|---|
| 712,455 | Germany | June 20, 1940 |
| 751,291 | Great Britain | June 27, 1956 |